(12) United States Patent
Oohashi et al.

(10) Patent No.: US 9,248,397 B2
(45) Date of Patent: Feb. 2, 2016

(54) CARBON DIOXIDE SEPARATING AND CAPTURING APPARATUS AND METHOD OF OPERATING SAME

(71) Applicant: KABUSHIKI KAISHA TOSHIBA, Minato-ku (JP)

(72) Inventors: Yukio Oohashi, Yokohama (JP); Takashi Ogawa, Yokohama (JP); Hideo Kitamura, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 77 days.

(21) Appl. No.: 14/163,268

(22) Filed: Jan. 24, 2014

(65) Prior Publication Data
US 2014/0338394 A1 Nov. 20, 2014

(30) Foreign Application Priority Data
May 20, 2013 (JP) .................................. 2013-106435

(51) Int. Cl.
*B01D 53/14* (2006.01)

(52) U.S. Cl.
CPC ........ *B01D 53/1425* (2013.01); *B01D 53/1475* (2013.01); *B01D 2258/0283* (2013.01); *Y02C 10/06* (2013.01)

(58) Field of Classification Search
CPC .................. B01D 2258/0283; B01D 53/1425; B01D 53/1475; Y02C 10/06
See application file for complete search history.

(56) References Cited

U.S. PATENT DOCUMENTS

| | | | |
|---|---|---|---|
| 2007/0283813 | A1 | 12/2007 | Iijima et al. |
| 2011/0113965 | A1 | 5/2011 | Iijima et al. |
| 2011/0113966 | A1 | 5/2011 | Iijima et al. |
| 2011/0120315 | A1 | 5/2011 | Iijima et al. |

(Continued)

FOREIGN PATENT DOCUMENTS

| | | |
|---|---|---|
| CN | 101310102 A | 11/2008 |
| EP | 1 736 231 A1 | 12/2006 |

(Continued)

OTHER PUBLICATIONS

Extended European Search Report issued Sep. 24, 2014 in Patent Application No. 14152866.1.

(Continued)

*Primary Examiner* — Duane Smith
*Assistant Examiner* — Cabrena Holecek
(74) *Attorney, Agent, or Firm* — Oblon, McClelland, Maier & Neustadt, L.L.P.

(57) ABSTRACT

In one embodiment, a carbon dioxide separating and capturing apparatus includes an absorption tower to allow a gas containing carbon dioxide to contact with an absorption liquid and discharge a rich liquid, a regeneration tower to cause the absorption liquid to release a gas containing the carbon dioxide and discharge a lean liquid, and first and second regenerative heat exchangers to heat the rich liquid with the lean liquid. The first regenerative heat exchanger heats the rich liquid with the lean liquid from the second regenerative heat exchanger and discharges the rich liquid in a liquid phase, and the second regenerative heat exchanger heats the rich liquid in the liquid phase with the lean liquid from the regeneration tower. The lean liquid from the first regenerative heat exchanger and the rich liquid from the second regenerative heat exchanger are fed to the absorption and regeneration towers, respectively.

4 Claims, 7 Drawing Sheets

(56) References Cited

U.S. PATENT DOCUMENTS

| | | |
|---|---|---|
| 2012/0118162 A1 | 5/2012 | Ogawa et al. |
| 2012/0174783 A1 | 7/2012 | Leister et al. |
| 2013/0071307 A1 | 3/2013 | Engelke et al. |
| 2013/0323147 A1 | 12/2013 | Iijima et al. |

FOREIGN PATENT DOCUMENTS

| | | | |
|---|---|---|---|
| EP | 1 736 231 B1 | 12/2006 | |
| EP | 1736231 A1 * | 12/2006 | ............. B01D 53/14 |
| EP | 2 455 154 A1 | 5/2012 | |
| EP | 2455154 A1 * | 5/2012 | |
| EP | 2 570 164 A1 | 3/2013 | |
| JP | 2004-323339 A | 11/2004 | |
| JP | 2012-106180 A | 6/2012 | |

OTHER PUBLICATIONS

Office Action issued Mar. 2, 2015 in Australian Patent Application No. 2014200565.

Office Action issued Nov. 4, 2015, in Chinese Patent Application No. 201410059738.5 (w/English-language Translation).

* cited by examiner

CARBON DIOXIDE SEPARATING AND CAPTURING APPARATUS AND METHOD OF OPERATING SAME

CROSS REFERENCE TO RELATED APPLICATION

This application is based upon and claims the benefit of priority from the prior Japanese Patent Application No. 2013-106435, filed on May 20, 2013, the entire contents of which are incorporated herein by reference.

FIELD

Embodiments described herein relate to a carbon dioxide separating and capturing apparatus and a method of operating the same.

BACKGROUND

Regarding capturing of carbon dioxide, carbon dioxide capture and storage technology has recently received attention as an effective measure against global warming issues concerned on a global mass scale. In particular, a method of capturing the carbon dioxide by using an aqueous solution has been studied in association with a thermal power plant and a process exhaust gas. For example, a carbon dioxide capturing apparatus is known which includes an absorption tower configured to generate a rich liquid by causing an absorption liquid to absorb a gas containing carbon dioxide, and a regeneration tower configured to heat the rich liquid discharged from the absorption tower to release the carbon dioxide and steam, separate the carbon dioxide from the steam, and return a generated lean liquid to the absorption tower. In this carbon dioxide capturing apparatus, the cold rich liquid is preheated with the hot lean liquid by a regenerative heat exchanger and is fed to the regeneration tower, so that an amount of energy required for releasing the carbon dioxide is reduced.

However, since the rich liquid and the lean liquid flow in liquid phases through the regenerative heat exchanger, heat transfer characteristics between these absorption liquids are low. When a temperature of the rich liquid is elevated close to an operation temperature of the regeneration tower by the regenerative heat exchanger for the purpose of reducing an amount of energy input at the regeneration tower, a difference in temperature between the rich liquid and the lean liquid becomes small in the vicinity of an outlet of the regenerative heat exchanger. Specifically, driving force for transferring heat from the lean liquid to the rich liquid becomes small in the vicinity of the outlet of the regenerative heat exchanger. Therefore, a large regenerative heat exchanger is required for securing a wide heating area. On the contrary, when the difference in temperature between the rich liquid and the lean liquid in the vicinity of the outlet of the regenerative heat exchanger is made large, a temperature elevation of the rich liquid at the regeneration tower becomes large, which increases the amount of energy input at the regeneration tower.

In order to solve such problems, a regenerative heat exchanger of plate type is used which is compact and has high heat transfer characteristics. It can also be conceivable to set a pressure of the rich liquid side to be low so as to generate steam (water vapor) and a carbon dioxide gas from the rich liquid while its temperature is elevated toward the outlet of the regenerative heat exchanger. In this case, extra heat recovery from the lean liquid can be achieved by latent heat of vaporization during the steam generation and heat of dissociation during the generation of the carbon dioxide gas from the rich liquid. Therefore, even when the temperature of the rich liquid is not elevated close to the operation temperature of the regeneration tower, the amount of energy input at the regeneration tower can be suppressed. Since the difference in temperature between the rich liquid and the lean liquid does not have to be made small, an increase of the heating area in the regenerative heat exchanger can be suppressed.

However, when the rich liquid in the regenerative heat exchanger of plate type becomes a two phase flow of a gas and a liquid in which the liquid and the gas are mixed, their flow rates in a plurality of channels between plates become uneven. When the ratio of the gas component in the two phase flow increases, heat transfer planes of the regenerative heat exchanger of plate type are dried. As a result, heat transfer performance of the regenerative heat exchanger deteriorates and its operation becomes unstable. On the other hand, when the temperature elevation of the rich liquid at the regenerative heat exchanger is made small to suppress the generation of the gas, the heat recovery from the lean liquid is not sufficient, causing an effect of reducing the amount of energy input at the regeneration tower to be small.

DETAILED DESCRIPTION

Embodiments will now be explained with reference to the accompanying drawings.

In one embodiment, a carbon dioxide separating and capturing apparatus includes an absorption tower to which a gas containing carbon dioxide is introduced, the absorption tower being configured to allow the gas to contact with an absorption liquid for absorbing the carbon dioxide, and to discharge a rich liquid which is the absorption liquid having absorbed the carbon dioxide, a regeneration tower configured to heat the absorption liquid to cause the absorption liquid to release a gas containing the carbon dioxide, and to discharge a lean liquid whose concentration of dissolved carbon dioxide is lower than a concentration of dissolved carbon dioxide concentration in the rich liquid, and first and second regenerative heat exchangers configured to heat the rich liquid by using the lean liquid. The first regenerative heat exchanger is a heat exchanger of plate type, heats the rich liquid discharged from the absorption tower by using the lean liquid discharged from the second regenerative heat exchanger, and discharges the rich liquid in a liquid phase. The second regenerative heat exchanger is a heat exchanger of shell-and-tube type, heats the rich liquid in the liquid phase discharged from the first regenerative heat exchanger by using the lean liquid discharged from the regeneration tower, and causes the rich liquid to generate a steam and to release a carbon dioxide gas. The lean liquid discharged from the first regenerative heat exchanger is fed to the absorption tower, and the rich liquid, the steam and the carbon dioxide gas discharged from the second regenerative heat exchanger is fed to the regeneration tower.

First Embodiment

Figure 1:
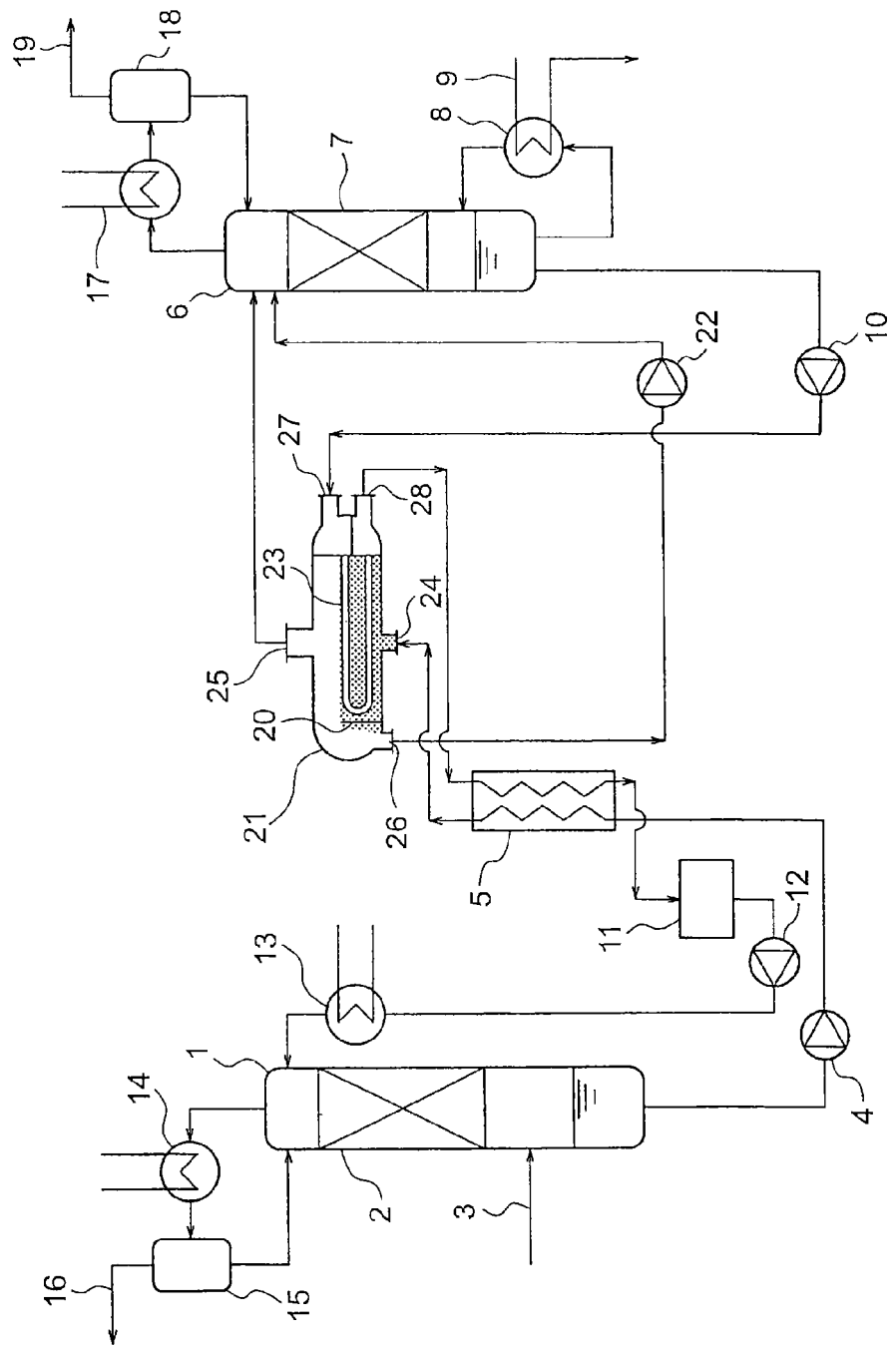
FIG. 1 is a schematic configuration diagram of the carbon dioxide separating and capturing apparatus of the first embodiment.

FIG. 1 is a schematic configuration diagram of the carbon dioxide separating and capturing apparatus of the first embodiment. As shown in FIG. 1, the carbon dioxide separating and capturing apparatus includes an absorption tower 1, a first regenerative heat exchanger 5 of plate type, a second regenerative heat exchanger 21 of shell-and-tube type, a regeneration tower 6, a reboiler 8, a lean liquid tank 11 and a lean liquid cooler 13.

A combustion exhaust gas 3 from a thermal power plant or the like is introduced to a lower portion of the absorption tower 1 via a combustion exhaust gas feeding inlet (not shown). In the absorption tower 1, the combustion exhaust gas 3 contacts with an absorption liquid, and carbon dioxide in the combustion exhaust gas 3 is absorbed in the absorption liquid. The absorption liquid is introduced from the upper portion of the absorption tower 1, passes through a packed bed 2 which is filled with packings for enhancing efficiency of gas-liquid contact, and flows down in the absorption tower 1. For example, a mixture of an amine compound and water can be used as the absorption liquid.

The greater part of the carbon dioxide in the combustion exhaust gas 3 is absorbed in the absorption liquid, and the exhaust gas whose carbon dioxide content is reduced is discharged from a top of the absorption tower 1. The exhaust gas discharged from the absorption tower 1 is cooled by an absorption tower reflux condenser 14 to condense moisture into droplets of water and they are separated from the gas by a gas-liquid separator 15. A carbon dioxide-released gas 16 is discharged to the outside. Since the condensed water separated by the gas-liquid separator 15 contains an absorption liquid component, it is returned to the absorption tower 1.

In a bottom portion of the absorption tower 1, a rich liquid which is the absorption liquid having absorbed the carbon dioxide is collected. The rich liquid collected in the bottom portion of the absorption tower 1 is discharged from the bottom portion of the absorption tower 1 by a rich liquid transferring pump 4 and passes through the first regenerative heat exchanger 5 and the second regenerative heat exchanger 21. The rich liquid is heated with a hot lean liquid discharged from a bottom portion of the regeneration tower 6 at the first regenerative heat exchanger 5 and the second regenerative heat exchanger 21. The heated rich liquid is fed to the regeneration tower 6.

The rich liquid fed to the regeneration tower 6 passes through a packed bed 7 which is filled with packings for enhancing efficiency of gas-liquid contact, flows down in the regeneration tower 6 and is collected in the bottom portion of the regeneration tower 6. The absorption liquid collected in the bottom portion of the regeneration tower 6 is partly discharged from the bottom portion of the regeneration tower 6 and the other is circulated between the regeneration tower 6 and the reboiler 8. The absorption liquid is heated with a heating medium 9 at the reboiler 8 and generates the steam and releases a carbon dioxide gas. These gases and the absorption liquid are returned into the regeneration tower 6 and only these gases pass through the packed bed 7 with their elevation. They heat the flowing-down absorption liquid. As a result, the carbon dioxide gas and the steam are released from the rich liquid fed to the regeneration tower 6, and a lean liquid which is the absorption liquid having released the carbon dioxide gas is collected in the bottom portion of the regeneration tower 6.

The exhaust gas containing the carbon dioxide gas and the steam released from the absorption liquid is discharged from the top of the regeneration tower 6. The exhaust gas discharged from the regeneration tower 6 is cooled by a regeneration tower reflux condenser 17 to condense moisture into droplets of water and they are separated from the gas by a gas-liquid separator 18. A carbon dioxide gas 19 is discharged to the outside. Meanwhile, the condensed water separated by the gas-liquid separator 18 is returned to the regeneration tower 6 for the purpose to hold a water concentration in the absorption liquid is held constant.

In the bottom portion of the regeneration tower 6, the lean liquid which is the absorption liquid whose concentration of the dissolved carbon dioxide is reduced is collected. The lean liquid is discharged from the bottom portion of the regeneration tower 6 and passes through the second regenerative heat exchanger 21 and the first regenerative heat exchanger 5 in this order with a lean liquid transferring pump 10. This hot lean liquid heats the cold rich liquid discharged from the bottom portion of the absorption tower 1 at the second regenerative heat exchanger 21 and the first regenerative heat exchanger 5. The lean liquid having passed through the first regenerative heat exchanger 5 is stored in the lean liquid tank 11. The lean liquid stored in the lean liquid tank 11 is fed to the upper portion of the absorption tower 1 after being cooled at the lean liquid cooler 13 with a lean liquid returning pump 12. The lean liquid fed to the absorption tower 1 is reused for absorption of the carbon dioxide contained in the combustion exhaust gas 3.

Next, the first regenerative heat exchanger 5 and the second regenerative heat exchanger 21 are described. The first regenerative heat exchanger 5 and the second regenerative heat exchanger 21 are arranged in series in order to exchange the heats between the rich liquid line from the absorption tower 1 toward the regeneration tower 6 and the lean liquid line from the regeneration tower 6 toward the absorption tower 1 intersect.

The first regenerative heat exchanger 5 is a compact heat exchanger of plate type. While the lean liquid from the regeneration tower 6 is hot because it has obtained heat with the reboiler 8, it is fed to the first regenerative heat exchanger 5 after heating the rich liquid at the second regenerative heat exchanger 21. At the first regenerative heat exchanger 5, the remaining heat of the lean liquid heats the rich liquid. The rich liquid starts to generate the steam and to release the carbon dioxide gas when its temperature exceeds the predetermined value determined by its pressure and concentration of the dissolved carbon dioxide. But at the first regenerative heat exchanger 5, the rich liquid is heated to the temperature of no generation of the steam and the carbon dioxide gas.

The rich liquid heated at the first regenerative heat exchanger 5 is fed to a shell side of the second regenerative heat exchanger 21 of shell-and-tube type via a rich liquid inlet 24, and contained as a two phase of a gas and a liquid in the lower portion of the second regenerative heat exchanger 21. For example, a heat exchanger of kettle reboiler type can be used as the heat exchanger of shell-and-tube type. The lean liquid from the regeneration tower 6 is fed to a lean liquid channel 23 of the second regenerative heat exchanger 21 via a lean liquid inlet 27, and heats the rich liquid collected in the lower portion. Thereby, the rich liquid generates the steam and releases the carbon dioxide gas and is separated into the gas and a semi-lean liquid after the gas is released due to the buoyancy. The gas released from the rich liquid is discharged from a gas outlet 25 on the upper side of the shell side and fed to the regeneration tower 6. The rich liquid (semi-lean liquid) whose concentration of the dissolved carbon dioxide is reduced due to releasing the gases overflows the weir 20 in the left side of the shell in the figure to be discharged from a semi-lean liquid outlet 26. This semi-lean liquid is fed to the regeneration tower 6 by a pump 22.

The lean liquid after heating the rich liquid at the second regenerative heat exchanger 21 is discharged from a lean liquid outlet 28 and fed to the first regenerative heat exchanger 5. It heats the cold rich liquid from the absorption tower 1.

As described above, the rich liquid in the present embodiment flows as the liquid phase in the first regenerative heat exchanger 5 of plate type, and generates the steam and releases the carbon dioxide gas at the second regenerative heat exchanger 21 of shell-and-tube type. At the first regenerative heat exchanger 5, the rich liquid is heated with the lean liquid in the liquid phase. Therefore, the device can be made compact. Moreover, deterioration of heat transfer performance due to drift flow can be suppressed to attain stable operation. At the second regenerative heat exchanger 21, releasing the gases from the rich liquid enables latent heat generated during the steam generation and dissociation of the carbon dioxide gas to be used, which increases the quantity of the heat recovery from the lean liquid.

Therefore, according to the present embodiment, the quantity of the heat recovery at the regenerative heat exchangers can be increased and the carbon dioxide separating and capturing apparatus including regenerative heat exchangers can be operated stably. Moreover, the amount of energy input required for releasing carbon dioxide at the regeneration tower 6 can be reduced.

At the second regenerative heat exchanger 21, the rich liquid is heated to generate the steam and to release the carbon dioxide gas and to become a two phase flow of a gas and a liquid. For the stable operations, this two phase flow is preferable to be an elevating or horizontal flow rather than a falling flow.

In the first embodiment, an example in which a heat exchanger of shell-and-tube type is used as the second regenerative heat exchanger 21 is described, whereas a heat exchanger of double tube type or a heat exchanger of jacket type in which a coil-shaped tube is immersed in the vessel or of spiral plate type can also be used. Furthermore, regarding the tube itself, the tube whose outer surface and/or inner surface are processed to have fins or the like can also be used to enhance the heat transfer performances.

Second Embodiment

Figure 2:
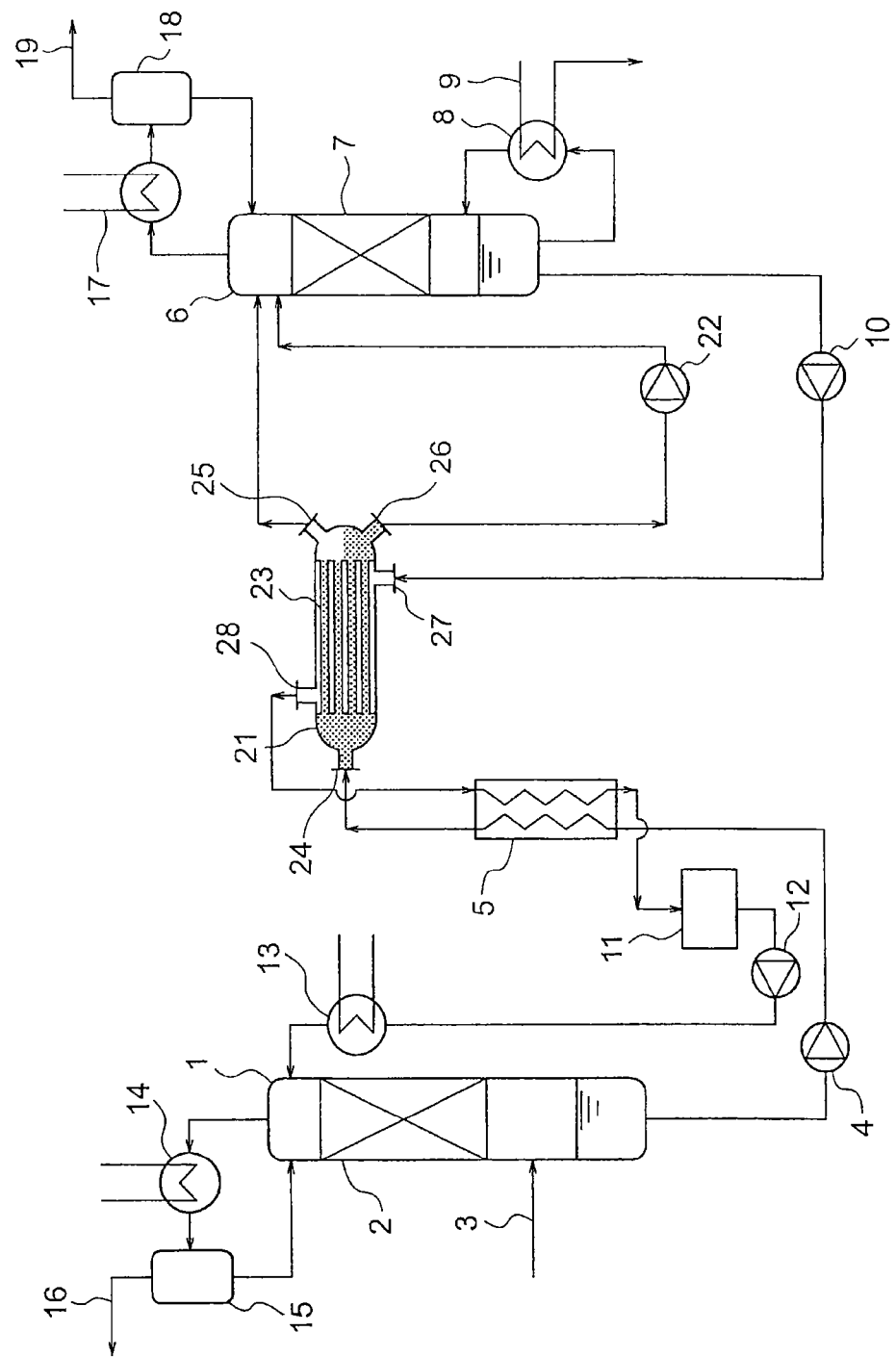
FIG. 2 is a schematic configuration diagram of the carbon dioxide separating and capturing apparatus of the second embodiment.

FIG. 2 is a schematic configuration diagram of the carbon dioxide separating and capturing apparatus of the second embodiment. The carbon dioxide separating and capturing apparatus of the present embodiment is different in that the rich liquid is fed to the tube side of the second regenerative heat exchanger 21 which is a heat exchanger of shell-and-tube type compared with the first embodiment shown in FIG. 1.

The rich liquid in a liquid phase heated at the first regenerative heat exchanger 5 is fed to the second regenerative heat exchanger 21 via the rich liquid inlet 24. The hot lean liquid from the regeneration tower 6 is fed to the shell side of the second regenerative heat exchanger 21 via the lean liquid inlet 27.

Heating the rich liquid at the second regenerative heat exchanger 21 generates the steam and releases the carbon dioxide gas. The rich liquid flows horizontally in two phases of a gas and a liquid and undergoes gas-liquid separation due to the gravity in a water chamber on the right side in the figure. The gas is discharged via the gas outlet 25 and fed to an upper portion of the regeneration tower 6. Meanwhile, the liquid is discharged via the semi-lean liquid outlet 26 and fed to the upper portion of the regeneration tower 6 by the pump 22. The lean liquid flows on the shell side to heat the rich liquid, and is then discharged from the lean liquid outlet 28 and fed to the regenerative heat exchanger 5.

Also in such a configuration, the rich liquid is heated with the lean liquid in a liquid phase at the first regenerative heat exchanger 5 as similar to the first embodiment. Therefore, the device can be made compact. Moreover, deterioration of heat transfer performance due to drift flow can be suppressed to attain stable operation. Releasing the gas from the rich liquid at the second regenerative heat exchanger 21 enables latent heat generated during the steam generation and dissociation of the carbon dioxide gas to be used, which increases the quantity of the heat recovery from the lean liquid.

Third Embodiment

Figure 3:
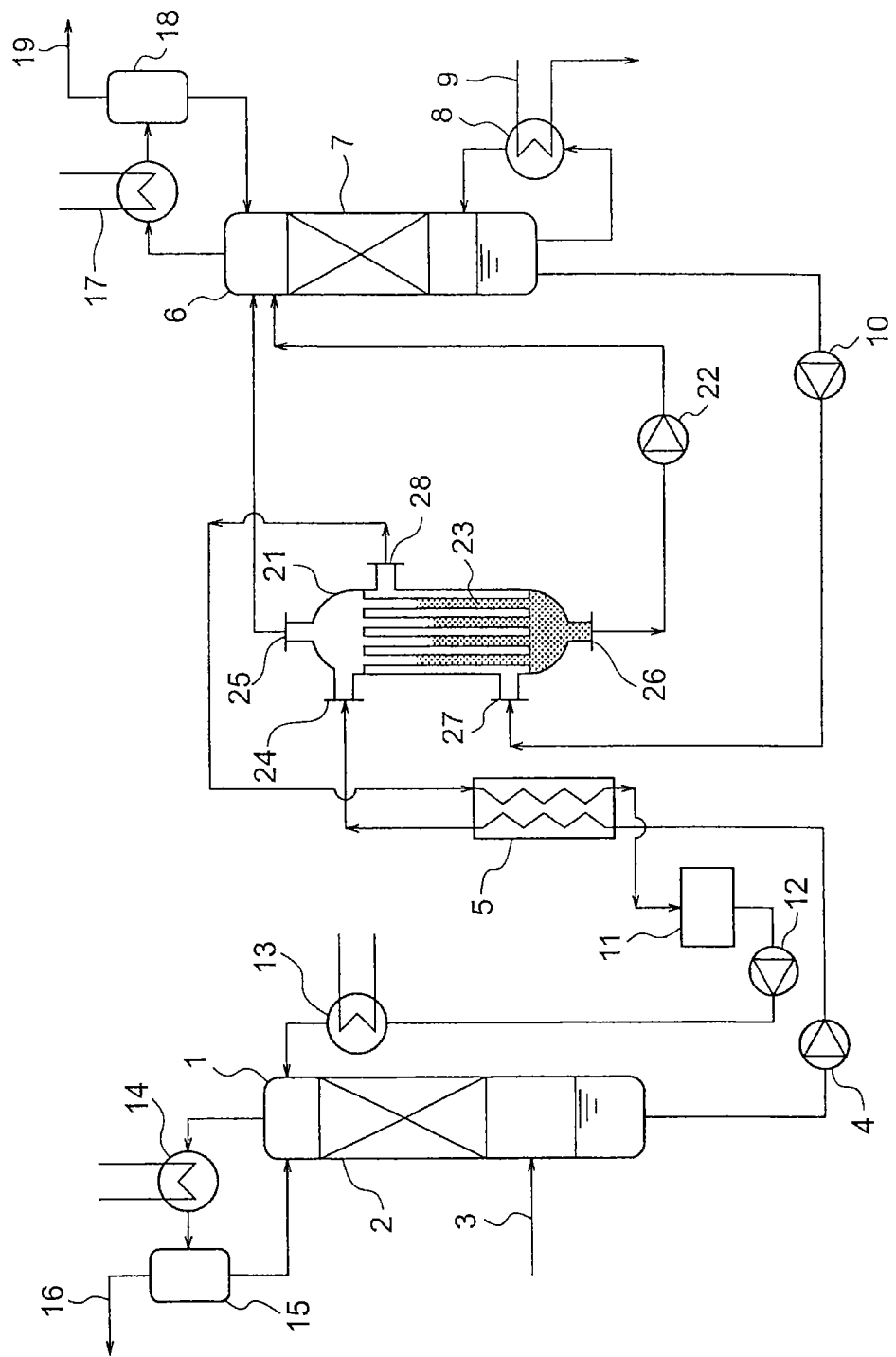
FIG. 3 is a schematic configuration diagram of the carbon dioxide separating and capturing apparatus of the third embodiment.

FIG. 3 is a schematic configuration diagram of the carbon dioxide separating and capturing apparatus of the third embodiment. The carbon dioxide separating and capturing apparatus of the present embodiment is different in that the second regenerative heat exchanger 21 of shell-and-tube type is installed vertically and is of falling liquid film type in which the rich liquid is allowed to flow downward on the tube side compared with the first embodiment shown in FIG. 1.

The rich liquid is fed via the rich liquid inlet 24 on a tube side top portion of the second regenerative heat exchanger 21. In this case, it is preferable that the pressure of the rich liquid is reduced by installing a pressure reducing valve or the like on an upstream side of the feeding inlet to cause a large amount of a gas to be generated to reduce the amount of the liquid falling in the tube. Due to this, a thin liquid film is formed on the tube wall surface and a space for the gas passing through is secured in the center portion. The liquid film is heated with the hot lean liquid flowing on the shell side from the regeneration tower 6 and falls, further generating the gas. The generated gas flows upward in the space of the center portion.

The gas is discharged from the gas outlet 25 on the tube side top portion and fed to the regeneration tower 6. The semi-lean liquid discharged from the semi-lean liquid outlet 26 on the bottom portion of the second regenerative heat exchanger 21 is fed to the upper portion of the regeneration tower 6 by the pump 22.

Also in such a configuration, the rich liquid is heated with the lean liquid in a liquid phase at the first regenerative heat exchanger 5 as similar to the first embodiment. Therefore, the device can be made compact. Moreover, deterioration of heat transfer performance due to drift flow can be suppressed to attain stable operation. Releasing the gas from the rich liquid at the second regenerative heat exchanger 21 enables latent heat generated during the steam generation and dissociation of the carbon dioxide gas to be used, which increases the quantity of the heat recovery from the lean liquid to be increased.

Fourth Embodiment

Figure 4:
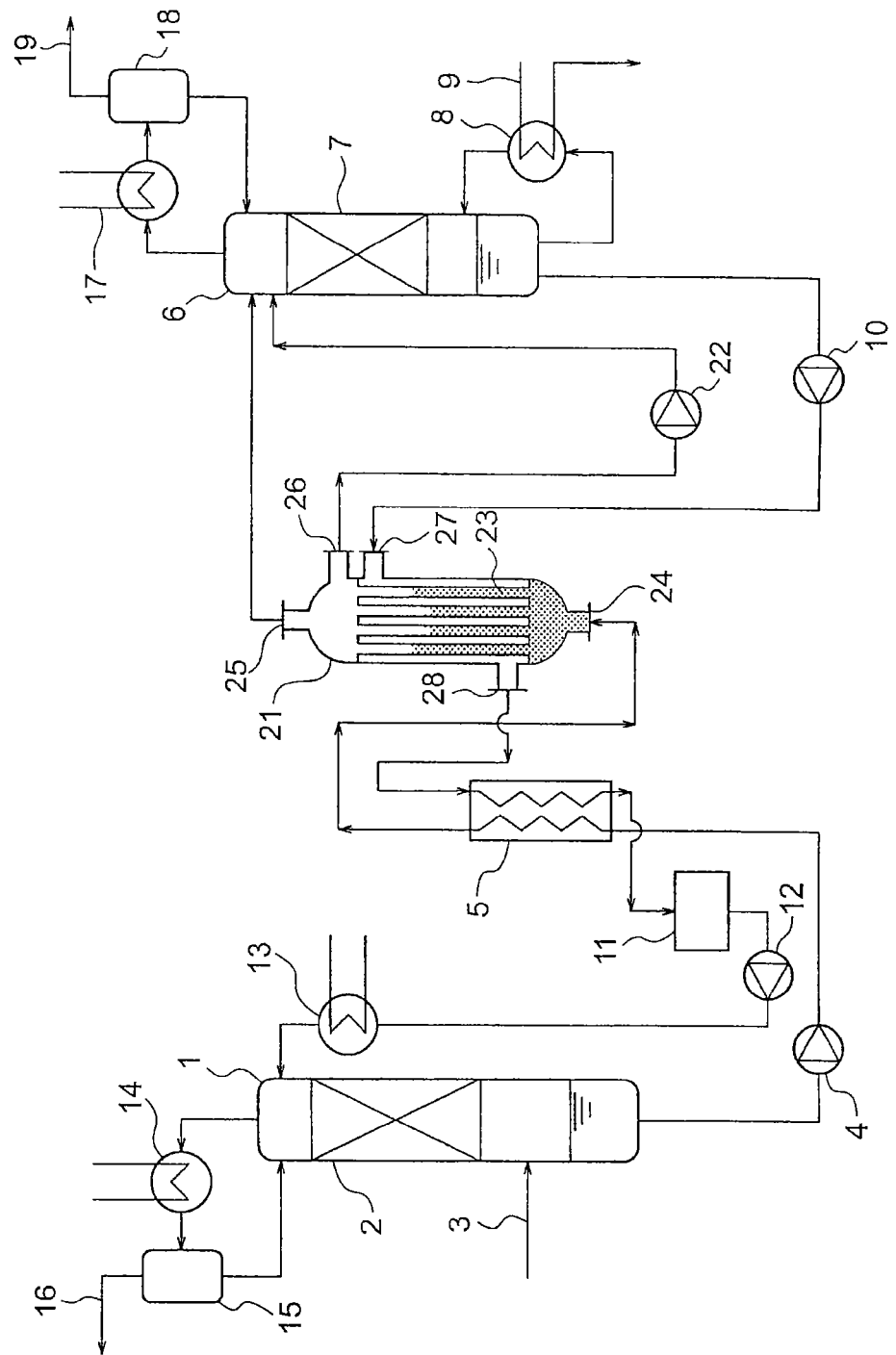
FIG. 4 is a schematic configuration diagram of the carbon dioxide separating and capturing apparatus of the fourth embodiment.

FIG. 4 is a schematic configuration diagram of the carbon dioxide separating and capturing apparatus of the fourth embodiment. The carbon dioxide separating and capturing apparatus of the present embodiment is different in that the second regenerative heat exchanger 21 which is a heat exchanger of shell-and-tube type is installed vertically and the rich liquid is caused to flow upward on the tube side compared with the first embodiment shown in FIG. 1.

The rich liquid is fed via the rich liquid inlet 24 on a tube side bottom portion of the second regenerative heat exchanger 21. The hot lean liquid from the regeneration tower 6 is fed to the second regenerative heat exchanger 21 via the lean liquid inlet 27 on a shell side upper portion, and flows downward on the shell side to be discharged from the lean liquid outlet 28. The rich liquid elevating on the tube side is heated with the hot lean liquid and generates the gas. The rich liquid is separated into the gas and the semi-lean liquid in the top portion of the second regenerative heat exchanger 21. The gas is discharged from the gas outlet 25 and the semi-lean liquid is discharged from the semi-lean liquid outlet 26. The discharged gas is fed to the upper portion of the regeneration tower 6. The discharged semi-lean liquid is fed to the upper portion of the regeneration tower 6 by the pump 22.

Also in such a configuration, the rich liquid is heated with the lean liquid in a liquid phase at the first regenerative heat exchanger 5 as similar to the first embodiment. Therefore, the device can be made compact. Moreover, deterioration of heat transfer performance due to drift flow can be suppressed to attain stable operation. Releasing the gas from the rich liquid at the second regenerative heat exchanger 21 enables latent heat generated during the steam generation and dissociation of the carbon dioxide gas to be used, which increases the quantity of the heat recovery from the lean liquid to be increased.

Fifth Embodiment

Figure 5:
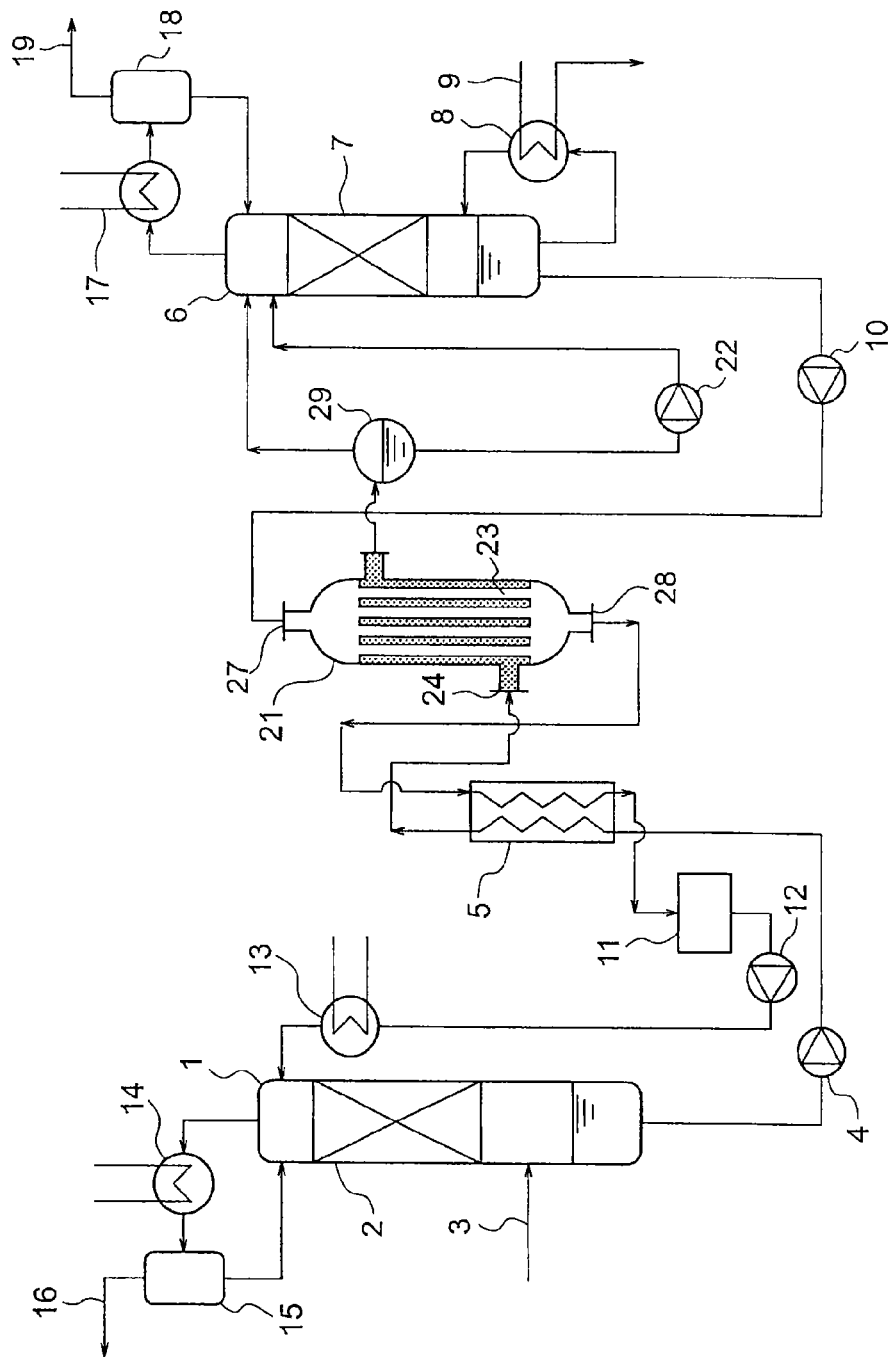
FIG. 5 is a schematic configuration diagram of the carbon dioxide separating and capturing apparatus of the fifth embodiment.

FIG. 5 is a schematic configuration diagram of the carbon dioxide separating and capturing apparatus of the fifth embodiment. The carbon dioxide separating and capturing apparatus of the present embodiment is different in that the second regenerative heat exchanger 21 which is a heat exchanger of shell-and-tube type is installed vertically and the rich liquid is caused to flow upward on the shell side compared with the first embodiment shown in FIG. 1.

The rich liquid is fed via the rich liquid inlet 24 on a shell side lower portion of the second regenerative heat exchanger 21. The hot lean liquid from the regeneration tower 6 is fed from the lean liquid inlet 27 on a tube side upper portion of the second regenerative heat exchanger 21, and flows downward toward the lean liquid outlet 28 on the bottom portion. At this stage, the rich liquid is heated with the hot lean liquid. Then, the rich liquid is discharged in two phases of a gas and a liquid from a nozzle on the shell side upper portion, elevating and generating the gas. The rich liquid in two phases of a gas and a liquid is separated into the gas and the liquid by a gas-liquid separator 29 and the gas is fed to the upper portion of the regeneration tower 6. The liquid (semi-lean liquid) is fed to the upper portion of the regeneration tower 6 by the pump 22.

The gas-liquid separator 29 may be omitted to feed the rich liquid in two phases of a gas and a liquid from the nozzle on the shell side upper portion directly to the upper portion of the regeneration tower 6.

Also in such a configuration, the rich liquid is heated with the lean liquid in a liquid phase at the first regenerative heat exchanger 5 as similar to the first embodiment. Therefore, the device can be made compact. Moreover, deterioration of heat transfer performance due to drift flow can be suppressed to attain stable operation. Releasing the gas from the rich liquid at the second regenerative heat exchanger 21 enables latent heat generated during the steam generation and dissociation of the carbon dioxide gas to be used, which increases the quantity of the heat recovery from the lean liquid to be increased.

Sixth Embodiment

Figure 6:
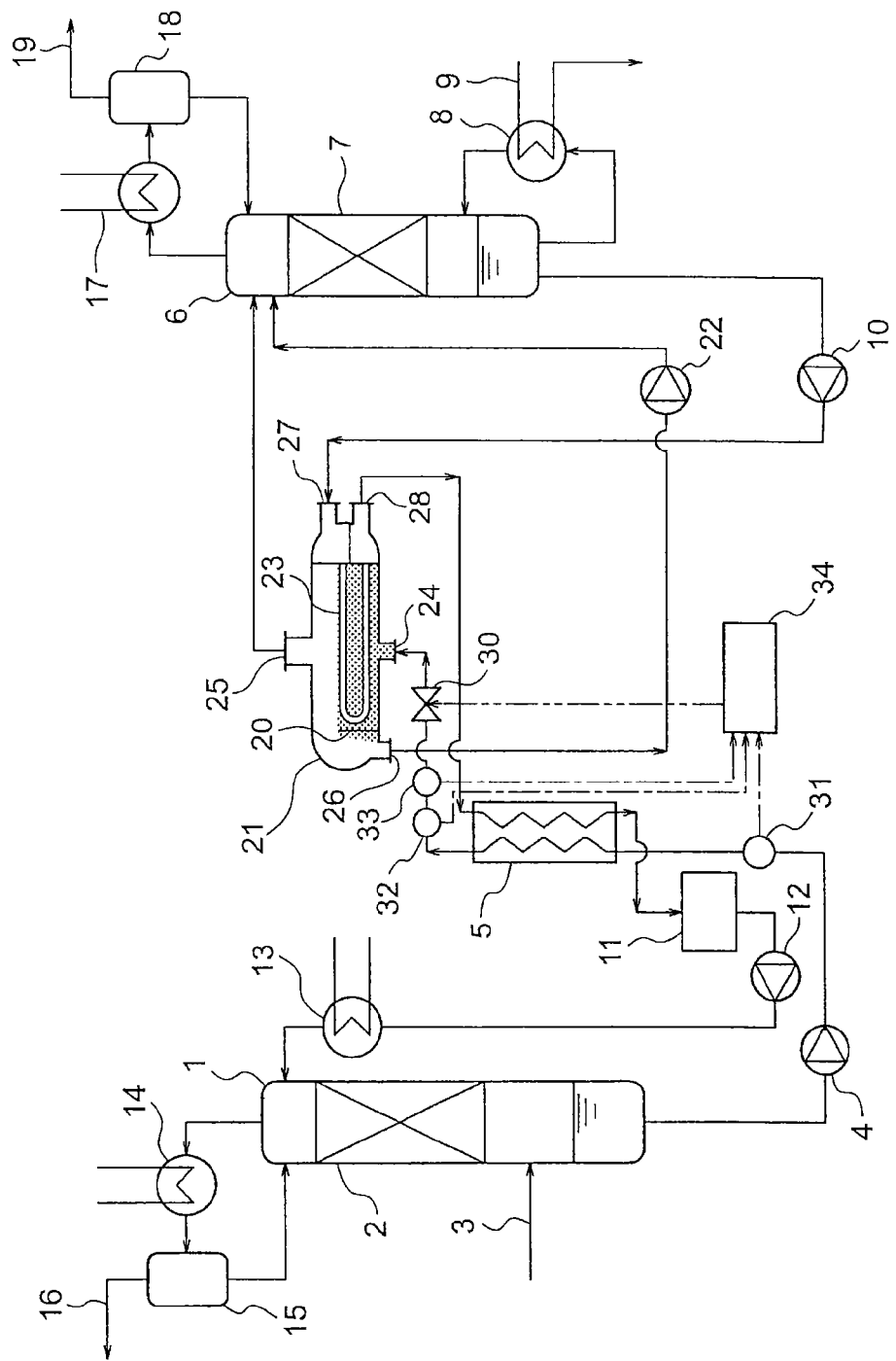
FIG. 6 is a schematic configuration diagram of the carbon dioxide separating and capturing apparatus of the sixth embodiment.

FIG. 6 is a schematic configuration diagram of the carbon dioxide separating and capturing apparatus of the sixth embodiment. The carbon dioxide separating and capturing apparatus of the present embodiment is different in that the state of the rich liquid fed to the second regenerative heat exchanger 21 is monitored compared with the first embodiment shown in FIG. 1.

As shown in FIG. 6, a pressure adjusting valve 30, a measuring device 32 of a temperature of the rich liquid, and a measuring device 33 of a pressure of the rich liquid are provided on the rich liquid line between the first regenerative heat exchanger 5 and the rich liquid inlet 24 of the second regenerative heat exchanger 21. The pressure adjusting valve 30 adjusts the pressure of the rich liquid. The measuring device 32 of the temperature of the rich liquid and the measuring device 33 of the pressure of the rich liquid measure the temperature and the pressure of the rich liquid discharged from the first regenerative heat exchanger 5 (to be fed to the second regenerative heat exchanger 21) to report the measurement results to a controller 34.

Moreover, a measuring device 31 of a concentration of the carbon dioxide dissolved in the rich liquid is provided on the rich liquid line between a reservoir in the bottom portion of the absorption tower 1 and an inlet portion of the first regenerative heat exchanger 5. The measuring device 31 of the concentration of the carbon dioxide dissolved in the rich liquid measures a dissolved carbon dioxide concentration of the rich liquid discharged from the absorption tower 1 (to be fed to the first regenerative heat exchanger 5) to report the measurement result to the controller 34.

The controller 34 has the gas-liquid equilibrium data of the absorption liquid used in the carbon dioxide separating and capturing apparatus. Thereby, the controller 34 calculates the pressure value at which the rich liquid starts to generate the gases in the first regenerative heat exchanger 5, on the basis of the measured values obtained from the measuring device 31 of the concentration of the dissolved carbon dioxide in the rich liquid and the measuring device 32 of the temperature of the rich liquid. Then, the controller 34 controls the adjustment valve 30 so that an outlet pressure of the first regenerative heat exchanger 5, that is, the measured value from the measuring device 33 of the pressure of the rich liquid is equal to or greater than the calculated pressure value.

Thereby, the rich liquid can be maintained stably in the liquid phase at the first regenerative heat exchanger 5, and in the two phase of the gas and the liquid at the second regenerative heat exchanger 21, which allows to operate stably.

According to the present embodiment, the rich liquid is heated with the lean liquid in the liquid phase at the first regenerative heat exchanger 5 as similar to the first embodiment. Therefore, the device can be made compact. Moreover, deterioration of heat transfer performance due to drift flow can be suppressed to attain stable operation. Releasing the gas from the rich liquid at the second regenerative heat exchanger 21 enables latent heat generated during the steam generation and dissociation of the carbon dioxide gas to be used, which increases the quantity of the heat recovery from the lean liquid to be increased.

Seventh Embodiment

Figure 7:
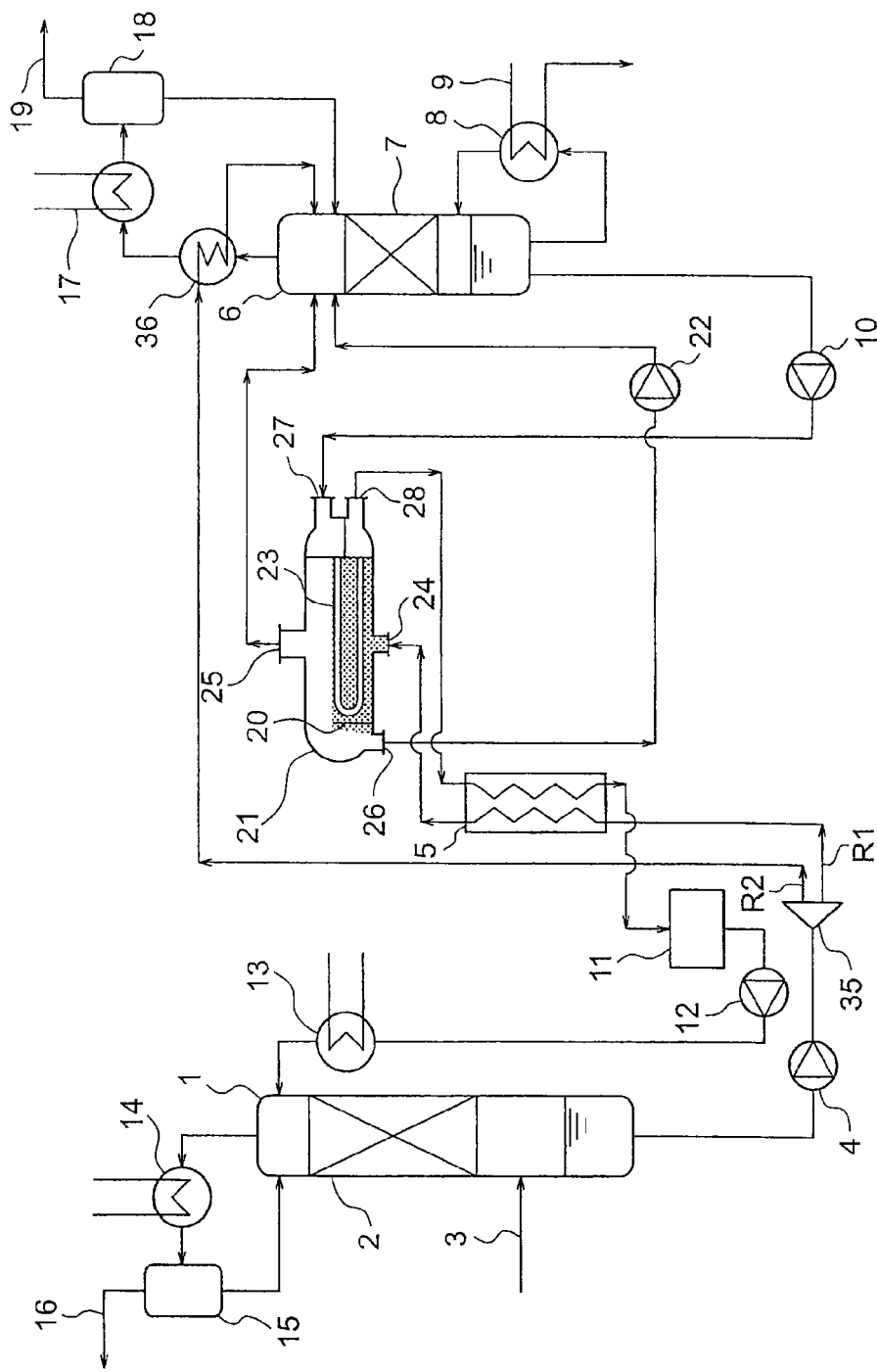
FIG. 7 is a schematic configuration diagram of the carbon dioxide separating and capturing apparatus of the seventh embodiment.

FIG. 7 is a schematic configuration diagram of the carbon dioxide separating and capturing apparatus of the seventh embodiment. The carbon dioxide separating and capturing apparatus of the present embodiment is different in that the rich liquid discharged from the absorption tower 1 is divided into two, one of them is fed to the first regenerative heat exchanger 5 and the other is fed to a carbon dioxide generating device 36 compared with the first embodiment shown in FIG. 1.

As shown in FIG. 7, the rich liquid discharged from the absorption tower 1 is divided into a first rich liquid R1 and a second rich liquid R2 at a flow divider 35. The first rich liquid R1 is fed to the first regenerative heat exchanger 5 and undergoes heat exchange with the lean liquid to be heated. The first rich liquid R1 is discharged in a liquid phase from the first regenerative heat exchanger 5 and further heated at the second regenerative heat exchanger 21 to be in two phases of a gas and a liquid.

The second rich liquid R2 is fed to the carbon dioxide generating device 36. The carbon dioxide generating device (heat exchanger) 36 heats the second rich liquid R2 by using a hot gas discharged from the top portion of the regeneration tower 6. Thereby, since heat held by the gas discharged from the top portion of the regeneration tower 6 can be captured to the second rich liquid R2, an amount of energy input to the reboiler 8 can further be reduced.

According to the present embodiment, the rich liquid is heated with the lean liquid in the liquid phase at the first regenerative heat exchanger 5 as similar to the first embodiment. Therefore, the device can be made compact. Moreover, deterioration of heat transfer performance due to drift flow can be suppressed to attain stable operation. Releasing the gas from the rich liquid at the second regenerative heat exchanger 21 enables latent heat generated during the steam generation and dissociation of the carbon dioxide gas to be used, which increases the quantity of the heat recovery from the lean liquid to be increased.

In the present embodiment, even when the carbon dioxide generating device 36 is omitted and the second rich liquid R2 is fed directly to the vicinity of the top portion of the regeneration tower 6 and allowed to contact with the hot gas inside the regeneration tower 6, the similar effect can be attained.

According to at least one of the embodiments described above, a recovery quantity of heat at the regenerative heat exchangers can be increased and the carbon dioxide separating and capturing apparatus can be stably operated.

While certain embodiments have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from the spirit of the inventions. The accompanying claims and their equivalents are intended to cover such forms or modifications as would fall within the scope and spirit of the inventions.

The invention claimed is:

1. A carbon dioxide separating and capturing apparatus comprising:
  an absorption tower to which a gas containing carbon dioxide is introduced, the absorption tower being configured to allow the gas to contact with an absorption liquid for absorbing the carbon dioxide, and to discharge a rich liquid which is the absorption liquid having absorbed the carbon dioxide;
  a regeneration tower configured to heat the absorption liquid to cause the absorption liquid to release a gas containing the carbon dioxide, and to discharge a lean liquid having a concentration of dissolved carbon dioxide which is lower than a concentration of dissolved carbon dioxide in the rich liquid; and
  first and second regenerative heat exchangers configured to heat the rich liquid by using the lean liquid,
  wherein
  the first regenerative heat exchanger is a heat exchanger of plate type, heats the rich liquid discharged from the absorption tower by using the lean liquid discharged from the second regenerative heat exchanger, and discharges the rich liquid in a liquid phase,
  the second regenerative heat exchanger is a heat exchanger of shell-and-tube type, heats the rich liquid in the liquid phase discharged from the first regenerative heat exchanger by using the lean liquid discharged from the regeneration tower, and causes the rich liquid to generate a steam and to release a carbon dioxide gas,
  the lean liquid discharged from the first regenerative heat exchanger is fed to the absorption tower, and
  the rich liquid, the steam and the carbon dioxide gas discharged from the second regenerative heat exchanger is fed to the regeneration tower,
  the apparatus further comprising:
  a first measuring device configured to measure the concentration of the dissolved carbon dioxide in the rich liquid fed to the first regenerative heat exchanger;
  a second measuring device configured to measure a temperature of the rich liquid discharged from the first regenerative heat exchanger;
  a third measuring device configured to measure a pressure of the rich liquid discharged from the first regenerative heat exchanger;
  a pressure adjusting valve configured to adjust the pressure of the rich liquid discharged from the first regenerative heat exchanger; and
  a controller configured to calculate, by using the values of the first and second measuring devices and gas-liquid equilibrium data of the absorption liquid, a pressure value at which the rich liquid discharged from the first regenerative heat exchanger maintains it in the liquid phase, and to control the pressure adjusting valve so that a measurement result of the third measuring device is equal to or greater than the calculated pressure value.

2. The apparatus of claim 1, further comprising a flow divider configured to divide the rich liquid discharged from the absorption tower into a first rich liquid and a second rich liquid,
  wherein
  the first rich liquid is fed to the first regenerative heat exchanger, and
  the second rich liquid is heated with a gas containing the carbon dioxide discharged from the regeneration tower.

3. The apparatus of claim 1, wherein the second regenerative heat exchanger is a heat exchanger of kettle reboiler type.

4. A method of operating a carbon dioxide separating and capturing apparatus including an absorption tower, a regeneration tower, a first regenerative heat exchanger of plate type, and a second regenerative heat exchanger of shell-and-tube type, the method comprising:

allowing a gas containing carbon dioxide to contact with a lean liquid discharged from the first regenerative heat exchanger in the absorption tower, and discharging a rich liquid which is the absorption liquid having absorbed carbon dioxide from the absorption tower;

heating the rich liquid discharged from the absorption tower by using the lean liquid discharged from the second regenerative heat exchanger in the first regenerative heat exchanger, and discharging the rich liquid in a liquid phase;

heating the rich liquid in the liquid phase discharged from the first regenerative heat exchanger by using the lean liquid discharged from the regeneration tower in the second regenerative heat exchanger, and allowing the rich liquid to generate a steam and to release a carbon dioxide gas;

feeding the rich liquid, the steam and the carbon dioxide gas discharged from the second regenerative heat exchanger to the regeneration tower to cause the rich liquid to release a gas containing the carbon dioxide, and discharging the lean liquid having a concentration of dissolved carbon dioxide which is lower than a concentration of dissolved carbon dioxide in the rich liquid;

measuring, by using a first measuring device, the concentration of the dissolved carbon dioxide in the rich liquid fed to the first regenerative heat exchanger;

measuring, by using a second measuring device, a temperature of the rich liquid discharged from the first regenerative heat exchanger;

measuring, by using a third measuring device, a pressure of the rich liquid discharged from the first regenerative heat exchanger;

calculating, by using the values of the first and second measuring devices and gas-liquid equilibrium data of the absorption liquid, a pressure value at which the rich liquid discharged from the first regenerative heat exchanger maintains it in the liquid phase; and controlling a pressure adjusting valve configured to adjust the pressure of the rich liquid discharged from the first regenerative heat exchanger so that a measurement result of the third measuring device is equal to or greater than the calculated pressure value.

\* \* \* \* \*